(12) United States Patent
Yu et al.

(10) Patent No.: US 6,484,065 B1
(45) Date of Patent: Nov. 19, 2002

(54) DRAM ENHANCED PROCESSOR

(75) Inventors: Peter K. Yu, Sunnyvale, CA (US); Michael D. Rostoker, Boulder Creek, CA (US)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/166,498

(22) Filed: Oct. 5, 1998

Related U.S. Application Data

(60) Provisional application No. 60/068,852, filed on Dec. 29, 1997, and provisional application No. 60/068,851, filed on Dec. 29, 1997.

(51) Int. Cl.[7] .............................................. G06F 19/00
(52) U.S. Cl. ........................... 700/121; 700/2; 700/4; 700/5; 700/117; 711/105; 711/112; 716/2; 716/3; 716/4; 365/149; 365/230.03; 712/1; 712/10; 712/16
(58) Field of Search .......................... 700/2–5, 18, 117, 700/121; 716/2, 3, 4; 711/105, 112; 365/201, 230.03, 230.05, 230.01, 149; 712/1, 10, 16, 20

(56) References Cited

U.S. PATENT DOCUMENTS

| | | | |
|---|---|---|---|
| 4,734,856 A | 3/1988 | Davis | 364/300 |
| 4,942,516 A | 7/1990 | Hyatt | 364/200 |
| 5,335,336 A * | 8/1994 | Kametani | 711/106 |
| 5,379,384 A * | 1/1995 | Solomon | 710/113 |
| 5,392,407 A * | 2/1995 | Heil et al. | 710/128 |
| 5,473,573 A | 12/1995 | Rao | 365/230.01 |
| 5,491,359 A | 2/1996 | May et al. | 257/373 |
| 5,492,857 A | 2/1996 | Reedy et al. | 437/63 |
| 5,506,437 A | 4/1996 | May et al. | 257/373 |
| 5,588,152 A | 12/1996 | Dapp et al. | 395/800 |
| 5,623,638 A * | 4/1997 | Andrade | 711/167 |
| 5,625,836 A | 4/1997 | Barker et al. | 395/800 |
| 5,634,108 A | 5/1997 | Freeman | 395/445 |
| 5,642,295 A | 6/1997 | Smayling | 364/551.01 |
| 5,649,161 A * | 7/1997 | Andrade et al. | 711/167 |
| 5,663,570 A | 9/1997 | Reedy et al. | 257/9 |
| 5,668,035 A | 9/1997 | Fang et al. | 438/239 |
| 5,818,532 A * | 10/1998 | Malladi et al. | 375/240.03 |
| 5,822,608 A * | 10/1998 | Dieffenderfer et al. | 712/20 |
| 5,883,814 A * | 3/1999 | Luk et al. | 716/2 |
| 5,978,304 A * | 11/1999 | Crafts | 365/230.03 |
| 6,094,704 A * | 7/2000 | Martin et al. | 711/105 |
| 6,151,256 A * | 11/2000 | Maesako et al. | 365/189.01 |
| 6,205,516 B1 * | 3/2001 | Usami | 711/105 |

* cited by examiner

Primary Examiner—Ramesh Patel
(74) Attorney, Agent, or Firm—Gerald E. Linden

(57) ABSTRACT

An efficient DSP or MPU is combined with efficient DRAM on a single IC die. To optimize the embedded memory, the chip includes wide-band connections to DRAM. Row and column addresses of DRAM can be applied at the same time using wide address busses. Additional metal lines lower the resistance of the word line in the DRAM circuits. For certain process steps, the processor block is masked off and the process steps unique to the fabrication of memory are performed on the memory block, and vice-versa. Process steps which are common to the processor and memory blocks can be performed simultaneously on the processor and memory blocks without masking off either block. Certain process steps can be employed in the fabrication of the one of the two processor and memory blocks in addition to or in lieu of processes normally used in the fabrication of that block. An electronic component (e.g., integrated circuit) incorporating the technique is suitably included in a system or subsystem having electrical functionality, such as general purpose computers, telecommunications devices, and the like.

31 Claims, 2 Drawing Sheets

220

240

DRAM ENHANCED PROCESSOR

CROSS-REFERENCE(S) TO RELATED APPLICATION(S)

This application is a continuation-in-part of commonly-owned, copending U.S. patent application Ser. No. 60/068,852 filed Dec. 29, 1997, and of commonly-owned, copending U.S. patent application Ser. No. 60/068,851 filed Dec. 29, 1997, both of which are incorporated in their entirety by reference herein.

TECHNICAL FIELD OF THE INVENTION

The present invention relates to digital signal processing (DSP) and, more particularly, to the integration of processors and memory.

BACKGROUND OF THE INVENTION

In recent years we have been witness to many advances in VLSI (very Large Scale Integration) technology. Minimum feature sizes on integrated circuits (ICs) continue to shrink, permitting dramatic improvements in processing speeds, reduced power consumption and increased functional density. Due to higher functional integration, new processing architectures for microprocessors (MPUs) and digital signal processors (DSPs) achieve higher performance by employing such techniques as VLIW (Very Long Instruction Word) and SIMD (Single Instruction Multiple Data). Other improvements in integrated circuit fabrication technology have made much denser RAMs possible, and have brought forth new memory architectures that promise substantial improvements in memory access efficiency for certain applications.

Traditionally, memory chip architecture and fabrication techniques have been cost and volume driven, while processing architectures and fabrications techniques have been performance and speed driven. New and emerging applications of MPU's and DSP's tend to require massive high-speed, data arrays which require massive high-speed locally-connected memories. The traditional design goals for memories and processors have resulted in a few performance and configuration "gaps" between DSP and memory functionality:

Operating Frequency: Although clock frequencies for DSPs or MPUs are approaching 500 MHz, the maximum access times for RAM memories is only approaching 150 MHz. Hence, a typical DSP or MPU may be capable of processing and execution speeds three times faster than the RAM to which it must connect.

Data Bus and Address Bus width: DSPs and MPUs, being performance-driven architectures, have moved rapidly towards very-wide address and data buses. Memories on the other hand, particularly Dynamic RAM architectures, however, tend to be rather "stingy" with package pins, and have moved towards such techniques as minimizing pinout by multiplexing the address bus, which limits their performance and tends to complicate interface circuitry.

To overcome these performance and configuration gaps between memory architecture and processing architecture:, memory designers have devised a number of improvements to the external interfaces of RAM memories. Among the improvements that have been made are: Rambus DRAM (RDRAM), Sync-Link and Synchronous Graphics RAM (SGRAM). However, even these improved DRAMs have some important, limiting constraints on their usage:

DRAM is typically only available in huge binary multiple increments (e.g, 4 Mbytes, 8 Mbytes, 16 Mbytes, etc.). If "HUGE_INCREMENT" plus 1 byte is required for a particular application, the designer is essentially "forced" into using double (twice) "HUGE_INCREMENT" amount of memory, and the remaining memory is wasted.

Cost is also a prevalent problem, and relates to memory granularity and architecture. For some applications, the size of general purpose RAM is not optimum. An example is when an application requires 4.2 MB of application specific memory and only 4M and 16 MB RAM are available. A 4.2 MB application specific memory module could cost less than two 4 MB RAMs or one 16 MB RAM if it were to be produced in sufficiently large volume to cover the development and production costs.

In an attempt to address these problems directly, there has been some research on the integration of a processor and DRAM onto a single chip. Most of this work consists of integrating the two functions (DRAM and processor) by using the fabrication process of one function and adapting the design of the other function to fit, for example by integrating an MPU function onto a DRAM process, by altering the multi-layer metal process of a processor to use the polysilicon-connected fabrication process of a DRAM. Unfortunately, this tends to adversely impact the processor's performance, since polysilicon connection are inherently more resistive than metal interconnection layers, resulting in "slower" circuits due to RC (resistive-capacitive) delay from the interaction between the polysilicon connection and on-chip parasitic capacitances.

Evidently, there is a need for a DSP or MPU with Embedded DRAM which is cost-effective and performs better than conventional DSP/DRAM or MPU/DRAM pairings.

DISCUSSION OF THE PRIOR ART

The following documents, all of which are US patents, all of which are incorporated by reference herein, disclose various techniques having some relevance to the present invention.

U.S. Pat. No. 5,663,570 (September 1997) discloses a high-frequency wireless communication system on a single ultrathin silicon on sapphire chip. The devices are fabricated using conventional bulk silicon CMOS processing techniques. See also related U.S. Pat. No. 5,492,857 (February 1996).

U.S. Pat. No. 5,642,295 (June 1997) discloses systems utilizing a single chip microcontroller having non-volatile memory devices and power devices.

U.S. Pat. No. 5,634,108 (May 1997) discloses a single chip processing system utilizing general cache and microcode cache enabling simultaneous multiple functions.

U.S. Pat. No. 5,625,836 (April 1997) discloses SIMD/MIMD processing memory element (PME). Eight processors on a single chip have their own associated processing element, significant memory, and I/O, and are interconnected with a hypercube-based topology. Particular attention is directed to column 22 lines 54–55 of this patent, wherein it is stated (with reference to FIG. 2 of the patent) that "we combine both significant memory and I/O and processor into a single chip." As also described therein (column 20, lines 49–50), our device is a 4 MEG CMOS DRAM believed to be the first general memory chip with extensive rom for logic." See also related U.S. Pat. No. 5,588,152 (December 1996) which discloses advanced parallel processor including advanced support hardware.

U.S. Pat. No. 5,506,437 (April 1996) discloses a microcomputer with high density RAM in separate isolation well on a single chip. See also related U.S. Pat. No. 5,491,359 (February 1996).

U.S. Pat. No. 5,473,573 (December 1995) discloses single chip controller-memory device and a memory architecture and methods suitable for implementing same.

U.S. Pat. No. 4,942,516 (July 1990) discloses single chip integrated circuit computer architecture.

U.S. Pat. No. 4.734,856 (March 1988) discloses autogeneric system.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:
A/D: Analog-to-Digital (converter).
ALU: Arithmetic Logic Unit.
ASIC: Application-Specific Integrated Circuit.
bit: binary digit.
byte: eight contiguous bits.
CAM: Content-Addressable Memory.
CMOS: Complementary Metal-Oxide Semiconductor.
CODEC: Encoder/De-Coder. In hardware, a combination of A/D and D/A converters. In software, an algorithm pair.
CPU: Central Processing Unit.
D/A: Digital-to-Analog (converter).
DRAM: Dynamic Random Access Memory
DSP: Digital Signal Processing (or Processor)
EEPROM: Also E2PROM. An electrically-erasable EPROM.
EPROM: Erasable Programmable Read-Only Memory.
Flash: Also known as Flash ROM. A form of EPROM based upon conventional UV EPROM technology but which is provided with a mechanism for electrically pre-charging selected sections of the capacitive storage array, thereby effectively "erasing" all capacitive storage cells to a known state.
FPGA: Field-Programmable Gate Array g: or (giga), 1,000,000,000
Gbyte: gigabyte(s).
GPIO: General Purpose Input/Output.
HDL: Hardware Description Language.
IC: Integrated Circuit.
I/O: Input/Output.
IEEE: Institute of Electrical and Electronics Engineers
JPEG: Joint Photographic Experts Group
k: (or kilo), 1000.
KHz: KiloHertz (1,000 cycles per second).
MAC: Media Access Control.
Mask ROM: A form of ROM where the information pattern is "Dmasked" onto memory at the time of manufacture.
MCM: Multi-Chip Module.
memory: hardware that stores information (data).
M: (or mega, or MEG), 1,000,000
MHz: MegaHertz (1,000,000 cycles per second).
MLT: Multi-Level Technology.
NVRAM: Non-volatile RAM.
PLL: Phase Locked Loop
PROM: Programmable Read-Only Memory.
PWM: Pulse Width Modulation.
PLD: Programmable Logic Device.
RAM: Random-Access Memory.
RISC: Reduced Instruction Set Computer (or Chip).
ROM: Read-Only Memory.
SIE: Serial Interface Engine.
software: Instructions for a computer or CPU.
SRAM: Static Random Access Memory.
UART: Universal Asynchronous Receiver/Transmitter.
USB: Universal Serial Bus.
UV EPROM: An EPROM. Data stored therein can be erased by exposure to Ultraviolet (UV) light.
VHDL: VHSIC (Very High Speed Integrated Circuit) HDL.

BRIEF DESCRIPTION (SUMMARY) OF THE INVENTION

An object of the present invention is to provide an improved technique for interfacing a DSP or CPU processor and memory.

Another object of the invention is to provide an efficient integration of DSP or CPU processor and memory on a single integrated circuit (IC) chip.

According to the invention, a DSP or MPU processor and DRAM are integrated on a single chip by utilizing one or more of the following techniques:

Since the architectures of a DSP or MPU are optimally configured for performance and those of DRAM for density and costs, radical changes in MPU (or DSP) and DRAM architectures and circuits are inappropriate. Accordingly, the present invention uses an approach that makes small but efficient changes to the processor and DRAM architectures and circuits, specifically:

Masking off one portion of the chip while one function (processor or DRAM) is fabricated, then effectively "reversing" the mask to fabricate the other function (DRAM or processor), integrating each function using its "native" process. Of course, this could potentially require a great number of process steps, resulting in a significantly higher fabrication cost than for other chips of the same size, and would do nothing to: address the functional/architectural performance gaps between processors and DRAM. To reduce the number of process steps,: common fabrication processes are preferably performed on both functions at the same time.

The following techniques address architecture-based performance improvements:

Organizing the DRAM on the chip in a wide word configuration. This is made possible by eliminating the need to conserve external pins. Since no external pins will be used to connect the DRAM to the processor, it is not necessary to conserve them. The processor is connected directly to the wide DRAM, thereby providing high bandwidth to the memory.

Eliminating address multiplexers and latches in the DRAM. Since the processor and DRAM co-reside on the same integrated circuit (IC) chip, the need for a multiplexed address bus is eliminated, and the processor's address signals can be connected in parallel directly the DRAMs array addressing inputs.

Implementing DRAM "word" lines in metal instead of polysilicon. This is made possible by exploiting the additional metal lines available in the fabrication process of the processor. The lower resistance of word line speeds up the performance of the DRAM circuit.

The density of the less performance-critical logic circuits in the processor can be increased by using multiple polysilicon interconnect layers available from the DRAM fabrication process.

These techniques take maximum advantage of the best characteristics of both technologies, and enhance the performance of the combination while making only minor architectural changes, if any, to either function (processor or DSP).

In digital signal processing (DSP) applications, two of the most widely used processing algorithms are the Discrete Fourier Transform (DFT) and the Discrete Cosine Transform (DCT). Both algorithms involve generating a series of sum-of-product terms resulting by multiplying of two matrices. A design that optimizes these functions requires two operands to compute the product and produces a result (sum-of-product) every cycle. Therefore, for optimal system performance, the processor/memory system of the present invention is configured to be capable of fetching two operands and storing a result during every clock cycle.

According to a preferred embodiment of the present invention, such a system is constructed by dividing the DRAM memory into at least three independent blocks—one for each of the two operands, and one for the result. By keeping the memory blocks (or "banks") separate from one another, all three memory operations (two fetches and one store) can occur in parallel (simultaneously).

According to an aspect of this preferred embodiment, DRAM can be divided into four independent blocks (banks), three for the aforementioned operands and result, the fourth, one being used as program memory, thereby permitting all three data accesses and an instruction fetch to be performed in parallel, without interfering with one another.

An integrated circuit (IC) employing the techniques of the present invention may be included in a system or subsystem having electrical functionality. Example systems may include general purpose computers; telecommunications devices (i.e., phones, faxes, etc.); networks; consumer devices; audio and visual receiving, recording and display devices; vehicle; etc. It is within the scope of the invention that such systems would benefit substantially from technique (s) of the present invention.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments. Certain elements in selected ones of the drawings are illustrated not-to-scale, for illustrative clarity. Often, similar elements throughout the drawings are referred to by similar references numerals. For examples the element 199 may be similar in many respects to the element 299 in another figure. Also, often, similar elements are referred to with similar numbers in a single drawing. For example, a plurality of elements 199 may be referred to as 199a, 199b, 199c, etc.

DETAILED DESCRIPTION OF THE INVENTION

Figure 1:
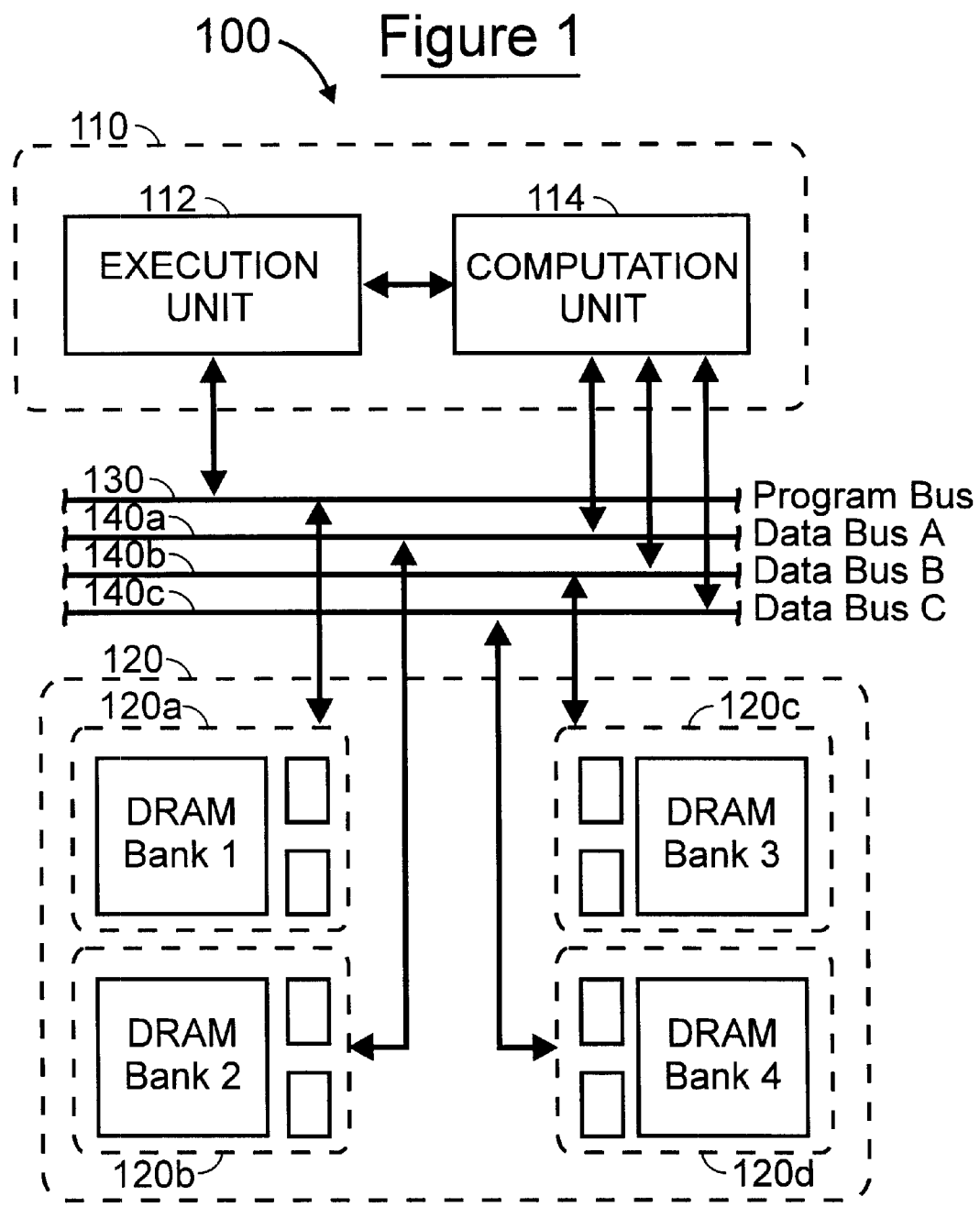
FIG. 1 is a block diagram of an integrated processor/memory architecture, according to the invention.

FIG. 1 shows a DSP processor core 110 comprising an execution unit 112 and a computation unit 114, and DRAM memory 120 comprising four independent DRAM banks 120a, 120b, 120c, and 120d, all of which are integrated onto a single integrated circuit (IC) chip.

As mentioned above, the native processes for fabricating a processor and for fabricating memory differ in: certain respects. Processes which are common to processor and memory fabrication are dealt with in a straightforward manner, by performing these processes on both the processor and memory areas of the IC chip. The processor section of the IC chip may be masked off to perform unique memory fabrication processes which are incompatible with processor fabrication. Conversely, the memory portions of the IC chip may be masked off to perform unique processor fabrication processes which are incompatible with memory fabrication. In certain instances, for example in the formation of conductive lines, processes can be "borrowed" in fabricating for example memory from the processes native to processor fabrication, for example by using metal lines rather than polysilicon lines in the fabrication of the memory blocks. Or, certain processes can be employed in the fabrication of the one of the two processor and memory blocks in addition to or in lieu of processes normally used in the fabrication of that block.

The four independent DRAM banks 120a, 120b, 120c, and 120d are accessible via four independent busses. A first DRAM bank 120a, connects to a program bus 130. A second DRAM bank 120b connects to a first data bus 140A. A third DRAM bank 120c connects to a second data bus 140B, and a fourth DRAM bank 120d connects to a third data bus 140C. The execution unit 112 fetches instructions from the first DRAM bank 120A via the program bus 130. The computational unit 114 accesses the second, third and fourth DRAM banks 120B, 120C, and 120D, via the first, second and third data busses, 140A, 140B, and 140C, respectively.

By dividing the memory into at least three independent banks 120b, 120c and 120d—one for each of two operands, and one for a result, and by keeping the memory banks separate from one another, and by providing three separate data buses 140a, 140b and 140c, each associated with a corresponding one of the memory banks, all three memory operations (two fetches and one store) can be performed by the computation unit 114 of the processor 100 in parallel (simultaneously). The fourth memory bank 120a and program bus 130 are used by the execution unit 112 for program memory, thereby permitting all three data accesses (two fetches, one store) and an instruction fetch to be performed in parallel, without interfering with one another.

As is readily apparent, in light of the description set forth hereinabove, the amount of RAM is readily adjusted to a desired design goal at any desired quantity between the typical binary (2 MB, 4 MB, 8 MB) constraints. For example 4.2 MB of memory is readily integrated onto the IC chip 100.

Such an efficiently integrated processor/memory system is highly useful, for example in audio compression and decoding, and in video encoding and decoding.

Physical Implementation

There has been described, hereinabove, an integrated circuit (IC) chip 100 having an embedded processor (110) and embedded memory (120).

The IC chip 100 is readily designed using a variety of available design tools (e.g., HDL, VHDL) and is readily manufactured using conventional semiconductor processing techniques. Designs may be modeled and validated, prior to manufacturing a device, using any of a number of simulation tools, such as SPICE. And a number of "floorplanning" tools are available to optimize the layout of circuits and functional blocks on the IC chip.

Modern semiconductor devices generally (typically) comprise hundreds of thousands (and sometimes millions) of "gates" which are the primitive "building blocks" for complex devices. Thousands or tens of thousands of gates may be interconnected to form a single functional block such as the various functional blocks described hereinabove (media processor, reconfigurable logic, etc.).

In an exemplary embodiment of the invention, a block of memory (e.g., DRAM) is combined with a processor block on a single IC chip. Previous integrated circuit designs, such as for the X86 (Intel) family of microprocessors have dedicated (required) a relatively large number of gates to the processor and a relatively few number of gates to on-chip memory. The requirements of the present invention are in marked contrast thereto.

Given the particular applications for which the IC chip 100 of the present invention is targeted, it is contemplated that the relatively simple embedded processor (110) would require only in the range of 6 k–10 k gates and that the overall embedded memory would be sized in the range of at least that many (6 k–10 k)gates, on up to several times that number of gates.

In other words, considering the number (P) of processor gates (e.g., six to ten thousand gates) to be one "unit", it is specifically contemplated that the number of gates (M). employed by the memory portion of the IC will be at least as many as, including several times P (M≧P, M>>P), and the following ratios ratios (M:P) of memory gates to processor gates are specifically contemplated by the present invention.

M≧P, M>5P, M>10P, M>20P, and M>30P

SYSTEM INTEGRATION

It is clearly contemplated that the technique(s) of the present invention, as disclosed hereinabove, can be integrated with other electronic components and subsystems to realize a subsystem or a system having electrical functionality such as, but not limited to: general-purpose computers; telecommunication devices (e.g., phones, faxes, etc); networks; consumer devices; audio and visual (video) receiving, recording and: display devices and systems; and vehicles such as planes, trains and automobiles.

Figure 2:
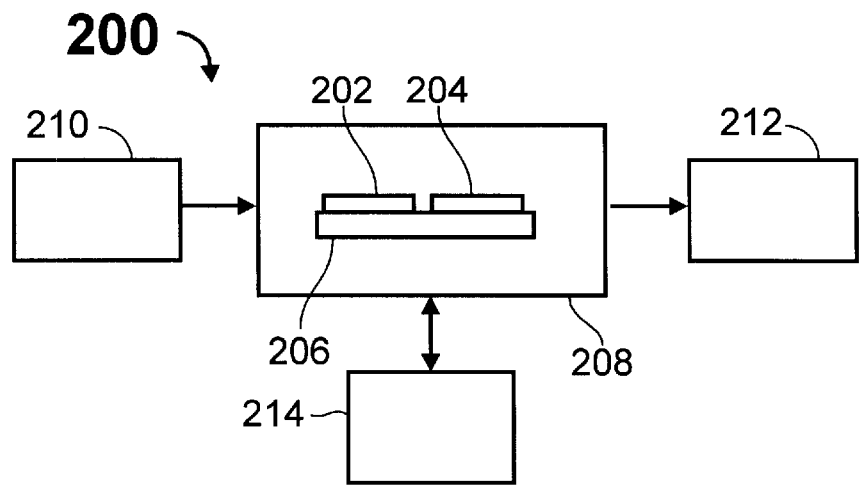
FIG. 2 is a schematic block diagram of a system incorporating the technique(s) of the present invention.

FIG. 2 illustrates an example of such an overall system 200. As shown therein, an electronic component 202 incorporating the technique(s) of the present invention can be connected, along with at least one other electronic component 204, on an interconnection substrate (e.g., motherboard) 206, thereby forming a subsystem 208, to which a number of peripheral (e.g., external) devices may be connected. Exemplary peripheral devices may include:
- one or more devices 210 for providing inputs to the subsystem 208, such as keyboards, pointing devices, digitizing tablets, and the like;
- one or more devices 212 for receiving outputs from the subsystem 208, such as video monitors, and the like; and
- one or more devices 214 for engaging in two-way communications with the subsystem 208, such as modems, printers, and the like.

It is clearly within the purview of a person having ordinary skill in the art to which the present invention most nearly pertains to effect such system integration, based on the descriptions set forth hereinabove.

Figure 2A:
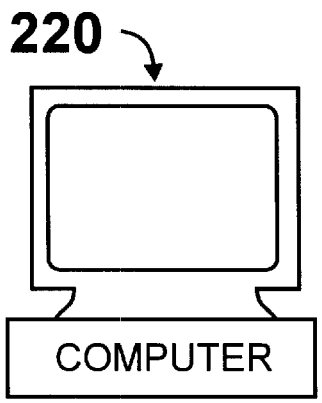
FIG. 2A is an illustration of a general purpose computer incorporating the technique(s) of the present invention.

FIG. 2A illustrates, for example, a general purpose computer 220 (compare 200) incorporating the present invention.

Figure 2B:
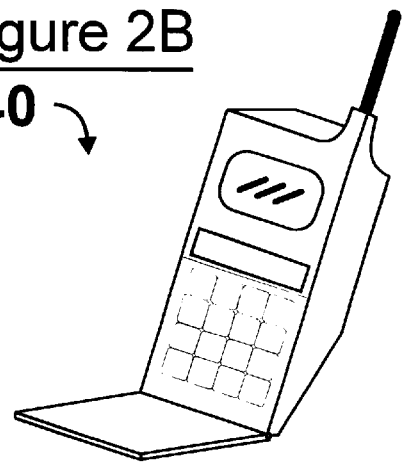
FIG. 2B is an illustration of a wireless telephone (cell phone) incorporating the technique(s) of the present invention.

FIG. 2B illustrates, for example, a wireless telephone 240 (compare 200) incorporating the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A DRAM enhanced processor, comprising:
    an integrated circuit (IC) chip;
    a processor functional block integrated onto the IC chip;
    a Dynamic RAM (DRAM) functional block integrated onto the IC chip; and
    at least three independent busses;
    wherein:
        the DRAM functional block is organized as at least three independent DRAM banks, and each of the at least three independent DRAM banks is accessible via a corresponding one of the at least three independent busses.

2. A DRAM enhanced processor, according to claim 1, wherein:
    the DRAM functional block is organized as four independent DRAM banks;
    the at least three independent busses includes four independent busses; and
    each of the four independent DRAM banks is accessible via a corresponding one of the four independent busses.

3. A DRAM enhanced processor, according to claim 1, wherein:
    each of the at least three independent DRAM banks is accessible from the processor functional block via the corresponding one of the three independent busses.

4. A DRAM enhanced processor, comprising:
    an integrated circuit (IC) chip;
    a processor functional block integrated onto the IC chip using a first fabrication process; and
    a Dynamic RAM (DRAM) functional block integrated onto the IC chip using a second fabrication process;
    wherein:
        the processor functional block is physically implemented with 6 k–10 k gates; and
        the DRAM functional block is physically implemented with at least as many gates as the processor functional block.

5. A DRAM enhanced processor, comprising:
    an integrated circuit (IC) chip;
    a processor functional block integrated onto the IC chip using a first fabrication process, and
    a Dynamic RAM (DRAM) functional block integrated onto the IC chip using a second fabrication process, wherein:
the processor functional block is physically implemented with a number (P) of gates; and
the DRAM functional block is physically implemented with a number (M) of gates which is at least as many gates as the processor functional block.

6. A DRAM enhanced processor, according to claim 5, wherein:
the number (M) is at least five times as many as the number (P).

7. A DRAM enhanced processor, according to claim 5, wherein:
the number (M) is at least ten times as many as the number (P).

8. A DRAM enhanced processor, according to claim 5, wherein:
the number (M) is at least twenty times as many as the number (P).

9. A DRAM enhanced processor, according to claim 5, wherein:
the number (M) is at least thirty times as many as the number (P).

10. An electronic system incorporating at least one integrated circuit (IC) chip, said IC chip comprising:
a processor functional block integrated onto the IC chip; and
a Dynamic RAM (DRAM) functional block integrated onto the IC chip; and
at least three independent busses,
wherein:
the DRAM functional block is organized as at least three independent DRAM banks, and each of the at least three independent DRAM banks is accessible via a corresponding one of the at least three independent busses.

11. An electronic system, according to claim 10, wherein:
each of the at least three independent DRAM banks is accessible from the processor functional block via the corresponding one of the three independent busses.

12. An electronic system incorporating at least one integrated circuit (IC) chip, said IC chip comprising:
a processor functional block integrated onto the IC chip using a first fabrication process; and
a Dynamic RAM (DRAM) functional block integrated onto the IC chip using a second fabrication process;
wherein:
the processor functional block is physically implemented with a number (P) of gates; and
the DRAM functional block is physically implemented with a number (M) of gates which is at least as many gates as the processor functional block.

13. An electronic system, according to claim 12, wherein:
the electronic system is selected from the group consisting of general-purpose computer, telecommunication device, network device, consumer device, receiver, recorder, display device, and vehicle.

14. An electronic system, according to claim 12, wherein:
the DRXM functional block is organized in a wide-word configuration to match a data bus width of the processor functional block, and
the DRAM functional block and the processor functional block are interconnected locally on the IC chip.

15. An electronic system, according to claim 12, wherein:
the number (M) is at least five times as many as the number (P).

16. An electronic system, according to claim 12, wherein:
the number (M) is at least ten times as many as the number (P).

17. An electronic system, according to claim 12, wherein:
the number (M) is at least twenty times as many as the number (P).

18. An electronic system, according to claim 12, wherein:
the number (M) is at least thirty times as many as the number (P).

19. A DRAM enhanced processor, comprising:
an integrated circuit (IC) chip;
a processor functional block integrated onto the IC chip, and
a Dynamic RAM (DRAM) functional block integrated onto the IC chip,
wherein:
the processor functional block is physically implemented with 6 k–10 k gates; and
the DRAM functional block is physically implemented with at least as many gates as the processor functional block.

20. A DRAM enhanced processor, comprising:
an integrated circuit (IC) chip;
a processor functional block integrated onto the IC chip, and
a Dynamic RAM (DRAM) functional block integrated onto the IC chip,
wherein:
the processor functional block is physically implemented with number (P) of gates; and
the DRAM functional block is physically implemented with a number (M) of gates which is at least as many gates as the processor functional block.

21. A DRAM enhanced processor, according to claim 20, wherein:
the number (M) is at least five times as many as the number (P).

22. A DRAM enhanced processor, according to claim 20, wherein:
the number (M) is at least ten times as many as the number (P).

23. A DRAM enhanced processor, according to claim 20, wherein:
the number (M) is at least twenty times as many as the number (P).

24. A DRAM enhanced processor, according to claim 20, wherein:
the number (M) is at least thirty times as many as the number (P).

25. An electronic system incorporating at least one integrated circuit (IC) chip, said IC chip comprising:
a processor functional block integrated onto the IC chip using a first fabrication process; and
a Dynamic RAM (DRAM) functional block integrated onto the IC chip using a second fabrication process;
wherein:
the processor functional block is physically implemented with 6 k–10 k gates; and
the DRAM functional block is physically implemented with at least as many gates as the processor functional block.

26. An electronic system incorporating at least one integrated circuit (IC) chip, said IC chip comprising:
a processor functional block integrated onto the IC chip, and a Dynamic RAM (DRAM) functional block integrated onto the IC chip, wherein:

the processor functional block is physically implemented with 6 k–10 k gates; and the DRAM functional block is physically implemented with at least as many gates as the processor functional block.

27. An electronic system incorporating at least one integrated circuit (IC) chip, said IC chip comprising:

a processor functional block integrated onto the IC chip, and a Dynamic RAM (DRAM) functional block integrated onto the IC chip, wherein:

the processor functional block is physically implemented with number (P) of gates; and the DRAM functional block is physically implemented with a number (M) of gates which is at least as many gates as the processor functional block.

28. An electronic system, according to claim 27, wherein:

the number (M) is at least five times as many as the number (P).

29. An electronic system, according to claim 27, wherein:

the number (M) is at least ten times as many as the number (P).

30. An electronic system, according to claim 27, wherein:

the number (M) is at least twenty times as many as the number (P).

31. An electronic system, according to claim 27, wherein:

the number (M) is at least thirty times as many as the number (P).

* * * * *